(12) United States Patent
Torr et al.

(10) Patent No.: US 6,524,685 B1
(45) Date of Patent: Feb. 25, 2003

(54) GLASS COMPOSITION

(75) Inventors: Ashley Carl Torr, Ormskirk; Louise Sara Butcher, Lymm, both of (GB)

(73) Assignee: Pilkington plc (GB)

( * ) Notice: Subject to any disclaimer, the term of this patent is extended or adjusted under 35 U.S.C. 154(b) by 0 days.

(21) Appl. No.: 09/787,577

(22) PCT Filed: Nov. 12, 1999

(86) PCT No.: PCT/GB99/03778

§ 371 (c)(1),
(2), (4) Date: Mar. 19, 2001

(87) PCT Pub. No.: WO00/29344

PCT Pub. Date: May 25, 2000

(30) Foreign Application Priority Data

Nov. 18, 1998 (GB) ............................................. 9825272

(51) Int. Cl.⁷ ......................... B32B 17/10; C03C 3/087; C03C 4/02; C03C 4/08
(52) U.S. Cl. ...................... 428/213; 428/215; 428/337; 428/437; 501/68; 501/69; 501/70; 501/72

(58) Field of Search ................................. 428/437, 215, 428/337, 213; 501/68, 69, 70, 72

(56) References Cited

U.S. PATENT DOCUMENTS 5,849,402 A * 12/1998 Kraemling ................... 428/220
6,087,284 A * 7/2000 Brix et al. ..................... 501/69

* cited by examiner

Primary Examiner—D. S. Nakarani
(74) Attorney, Agent, or Firm—Marshall & Melhorn, LLC

(57) ABSTRACT

A high performance green glass composition containing at least 14.5% by weight $Na_2O$, at least 10.5% by weight CaO, at least 0.5% by weight total iron (measured as $Fe_2O_3$) and is substantially magnesium-free, the glass thus produced having a ferrous value of at least 30% and a performance (light transmission minus Direct Solar Heat Transmission) of at least 28% at at least one thickness of 2.8 mm to 5 mm. The invention also relates to glasses made from such composition and to a laminated glass assembly in which two sheets of glass sandwich a polymeric material, at least one, preferably both, of the sheets of glass having such a composition.

21 Claims, No Drawings

GLASS COMPOSITION

CROSS-REFERENCE TO RELATED APPLICATIONS

This application is a filing under 35 U.S.C. 371 in the United States Patent and Trademark Office as the Designated/Elected Office of International Application No. PCT/GB99/03778 filed Nov. 12, 1999, which claims priority of GB Patent Application No. 9825272.9 filed Nov. 18, 1998.

BACKGROUND OF THE INVENTION

The present invention relates to a glass composition. More particularly, the present invention relates to a glass composition for producing a high performance green glass containing iron oxide. A "high performance" glass is one in which the light transmission of the glass is greatly in excess of the heat transmission thereof.

The light transmission of a glass is of major importance if the glass is for use in automotive vehicles. This is because many countries require any windows in a vehicle forward of the B-post to have a light transmission of at least 70%. The heat transmission is usually denoted by the abbreviation "DSHT" which stands for the Direct Solar Heat Transmission. The heat transmission is dependent upon the ability of the glass to absorb radiation in the infra-red region of the electromagnetic spectrum and, to a lesser extent, in the visible portion of the spectrum. In some cases, it is also desirable to absorb radiation in the ultraviolet region of the spectrum. Iron oxide is well known as a colorant in glass compositions and has the advantage that it consists of a mixture of both ferrous and ferric iron. Ferrous iron absorbs radiation in the infra-red and ferric iron absorbs radiation in the ultraviolet region of the spectrum.

For producing high performance glasses, it is obviously desirable to increase the ratio of ferrous iron to ferric iron in the iron added to the glass composition. However, particularly when the glass is to be made by the float process, merely increasing the ferrous iron content is not possible. One problem is that iron is a very good absorber of heat. It absorbs heat in the melting tank and the bottom of the tank therefore cools. In so doing, the glass becomes more difficult to melt and problems of devitrification and silica scum arise. It is possible to use special techniques such as vacuum refining to achieve high ferrous ratios in the glass. However, such techniques are extremely expensive to operate. The more usual way of achieving a high ferrous ratio is to use a reducing agent, such as carbon, in the batch of raw materials. However, the use of carbon can also give rise to the problem of silica scum. In passing, it is pointed out that silica scum is a layer of undissolved silica which lies on the surface of the molten glass and can, in extreme cases, form a raft which extends over the entire surface of the glass.

To minimise this problem, it is customary to add sulphate to the batch. Such sulphate is generally in the form of sodium sulphate or calcium sulphate. However, sulphate is not only an agent which assists in the melting of the glass but also acts as an oxidising agent. Thus, the sulphate tends to react with the carbon leaving less carbon to reduce the ferric iron to ferrous iron. Accordingly, although the addition of carbon appears to be a simple way of increasing the ferrous ratio in the glass, it does not, in practice, achieve this, or at least not to the desired extent.

Most glasses also contain sodium. In many patent specifications, the amount of sodium present is stated to be from 10% to 20%. In practice, however, the amount of sodium present lies within the range of 12% to 13%. There are three main reasons for this. Firstly, the higher the amount of sodium in the composition, the higher the cost of the glass. More importantly, high amounts of sodium in a glass have adverse effects on the viscosity of the glass. The third major problem associated with the use of high amounts of sodium is that the glass made therefrom have low durability which is often evidenced by a staining of the glass which makes it unacceptable to users of the glass.

Calcium is also used in glass but has the disadvantage that, if used in large quantities, it causes devitrification. The approximate upper limit before this occurs is 11% by weight. Magnesium is also used in glass. If the content of magnesium in the glass is reduced, the minimum of the ferrous iron absorption, which normally is centred around 1050 nm in a conventional float glass, is shifted to a longer wavelength. This leads both to an improved light transmission and to a reduced solar heat transmission, both of which are clearly beneficial in a high performance glass. Moreover, magnesium is, generally, an expensive component of the batch and its removal will reduce the cost of the glass. However, magnesium slows the rate of crystal growth in the glass and the removal thereof means that the rate of crystal growth increases which manifests itself in devitrification. Furthermore, magnesium is believed to improve the durability of the glass and it is generally believed that its removal would adversely affect the durability of the glass.

OBJECT OF THE INVENTION

The present invention seeks to provide an iron-containing green glass composition which has a performance in excess of 28%, ideally over 30%, with a ferrous content in excess of 30% but which can be easily melted without the disadvantages outlined hereinbefore.

SUMMARY OF THE INVENTION

According to the present invention, there is provided a green glass composition which contains at least 14.5% by weight $Na_2O$, at least 10.5% CaO, and at least 0.5% total iron (measured as $Fe_2O_3$) the glass being substantially magnesium-free, the glass thus produced having a ferrous value of at least 30% and a performance (light transmission minus direct solar heat transmission) of at least 28% at at least one thickness of 2.8 mm to 5 mm.

As will be readily apparent to those skilled in the art, the term "magnesium-free" denotes that no magnesium is added to the composition. However, magnesium will be present in the glass as an impurity or a trace element in the batch materials or as a residual carry-over from a previous run on a furnace. In practical terms, therefore, the maximum amount of magnesium present in the composition is unlikely to exceed about 0.2 % by weight of the total composition.

We have surprisingly found that such a composition provides a glass which has a difference between its light transmission and its DSHT of at least 28 percentage points, usually in excess of 30%. Even though the ferrous value is in excess of 30%, such composition may be melted on a float furnace with all of the disadvantages expected by the prior art being obviated or at least minimised.

DESCRIPTION OF THE PREFERRED EMBODIMENTS

In a preferred embodiment of the present invention, the glasses produced have a light transmission of at least 70% and a performance of at least 30%.

Desirably, the glass contains at least 0.8% total iron. It is advantageous if the ferrous value is at least 35%.

We have found that if the composition contains higher than conventional amounts of both sodium and calcium, the composition is easier to melt. By so doing, the amount of sulphate which is normally added to the batch composition simply to facilitate the melting can be reduced. The reduction of the ferric iron to ferrous iron is effected by using a reducing agent, the most common of which is carbon. However, as mentioned hereinbefore, it will be readily appreciated that if a reducing agent and an oxidising agent, such as sulphate are both present in the batch, they tend to cancel one another out and the desired ferrous ratio is not achieved. In the present invention, however, the amount of sulphate needed to facilitate the melting can be reduced. Clearly, therefore, the carbon acts as a reducing agent on the ferric iron rather than the sulphate and high ferrous ratios can be achieved. Conversely, the amount of sulphate may be maintained substantially constant whilst the amount of carbon may be increased.

However, excessive amounts of calcium present in the composition can cause devitrification problems in the furnace. For this reason, it is desirable if the amount of CaO present in the composition is limited to an upper value of 12%, but preferably below 11%.

The composition of the present invention may be free from potassium and aluminium (other than amounts present as impurities in the sand). However, either or both of these materials may be present in the composition of the present invention, if desired. Potassium increases the thermal expansion coefficient of the glass and aluminium improves the durability of the glass. If present, the amount of potassium is desirably less than or equal to 1%. Similarly, it is preferred if the amount of aluminium is limited to a maximum of 1.6%.

Furthermore, zirconium may also be present in the composition so as to improve the durability of the glass but it is preferred if the amount thereof is no greater than 1%.

Furthermore, titanium may be present in the composition. Titanium has the advantage that it reduces the ultraviolet transmission of the glass, thereby accentuating the effect produced by the ferric iron, compared with ferrous iron, in the glass.

In this connection, it is desirable, if titanium is included in the composition, if the titanium is in the form of ilmenite. Ilmenite is ferrous titanate and therefore also assists in the production of a glass having a high ferrous ratio. However, if present, it is advantageous if the amount of titanium, measured as $TiO_2$, present is limited to a maximum of 1%. Advantageously, the amount of titanium lies within the range 0.20% to 0.60%.

Cerium and/or vanadium, both of which act as absorbers of ultraviolet radiation, may also be included in the composition.

Glass sheets made from the composition of the present invention may have a performance of at least 28% at a thickness of 5 mm. If the glass is to be made relatively thin, say 2.8 mm, the composition of the present invention allows such a glass to have a performance of at least 28%.

In a preferred embodiment of the present invention, a glass sheet is made from a composition comprising 70% to 75% (by weight) $SiO_2$, 0.25% to 0.55% $TiO_2$ and 0.75% to 0.95% $Fe_2O_3$, the glass having a ferrous value of 33% to 37% and a light transmission of at least 70% at a nominal thickness of 4 mm.

A further preferred embodiment provides a glass sheet formed from a composition comprising 70% to 75% (by weight) $SiO_2$, 0.25% to 0.45% $TiO_2$ and 0.95% to 1.05% $Fe_2O_3$, the glass having a ferrous value of from 33% to 37% and a light transmission of at least 70% at a nominal thickness of 3.15 mm.

In a still further preferred embodiment, there is provided a glass sheet formed from a composition comprising 70% to 75% (by weight) $SiO_2$, 0.50% to 0.65% $Fe_2O_3$ and 0.25% to 0.55% $TiO_2$, the glass having a ferrous value of between 33% and 37% and a light transmission of at least 70% at a nominal thickness of 4.6 mm.

In all of the above cases, the glass is in monolithic form. However, in each case, particularly that described in the immediately preceding paragraph, the glass may be in the form of a laminate comprising two sheets of glass sandwiching an interlayer. In such a case, at least one of the sheets of glass, preferably both, are made from a composition in accordance with the present invention. The interlayer, in such a case, is advantageously polyvinyl butyral.

The invention will be further described, by way of illustration only, with reference to the following Examples. In the Examples, Table 1 shows the composition of a number of glasses in accordance with the present invention, Table 2 shows various physical and optical properties of the glasses of Table 1 and Table 3 shows details of certain glasses appearing in Tables 1 and 2 converted to different thicknesses.

In Table 2, the light transmission has been measured using Illuminant A, which latter is well known in the art.

The Direct Solar Heat Transmission is measured according to International Standard 9050/ISO 9050) at Air Mass 2 over the range 350 nm to 2100 nm. The ultraviolet transmission stated in Table 2 has been measured according to the Parry-Moon Rectangular Rule which is also well known in the art. Similarly, the a* and b* values are the colour coordinates of the glass measured according to the Cie-Lab system under Illuminant C. Both the Cie-Lab system and Illuminant C are terms well known in the art.

TABLE 1

| Glass No. | wt % | | | | | | | | | | |
|---|---|---|---|---|---|---|---|---|---|---|---|
| | $SiO_2$ | $Na_2O$ | $K_2O$ | MgO | CaO | $Al_2O_3$ | $TiO_2$ | $ZrO_2$ | $Fe_2O_3$ | $SO_3$ | Total |
| 1 | 71.82 | 14.90 | 0.60 | 0.00 | 10.50 | 1.00 | 0.04 | 0.00 | 0.84 | 0.30 | 100.0 |
| 2 | 71.84 | 14.90 | 0.60 | 0.00 | 10.50 | 1.00 | 0.04 | 0.00 | 0.82 | 0.30 | 100.0 |
| 3 | 71.79 | 14.90 | 0.60 | 0.00 | 10.50 | 1.00 | 0.04 | 0.00 | 0.87 | 0.30 | 100.0 |
| 4 | 71.79 | 14.90 | 0.60 | 0.00 | 10.50 | 1.00 | 0.04 | 0.00 | 0.87 | 0.30 | 100.0 |
| 5 | 73.24 | 14.90 | 0.05 | 0.00 | 10.50 | 0.10 | 0.04 | 0.00 | 0.87 | 0.30 | 100.0 |
| 6 | 73.24 | 14.90 | 0.05 | 0.00 | 10.50 | 0.10 | 0.04 | 0.00 | 0.87 | 0.30 | 100.0 |
| 7 | 71.19 | 14.50 | 1.00 | 0.00 | 10.50 | 1.60 | 0.04 | 0.00 | 0.87 | 0.30 | 100.0 |
| 8 | 72.59 | 14.90 | 0.30 | 0.00 | 10.50 | 0.50 | 0.04 | 0.00 | 0.87 | 0.30 | 100.0 |
| 9 | 72.59 | 14.90 | 0.30 | 0.00 | 10.50 | 0.50 | 0.04 | 0.00 | 0.87 | 0.30 | 100.0 |

TABLE 1-continued

| Glass No. | SiO$_2$ | Na$_2$O | K$_2$O | MgO | CaO | Al$_2$O$_3$ | TiO$_2$ | ZrO$_2$ | Fe$_2$O$_3$ | SO$_3$ | Total |
|---|---|---|---|---|---|---|---|---|---|---|---|
| 10 | 71.53 | 14.90 | 0.60 | 0.00 | 10.50 | 1.00 | 0.30 | 0.00 | 0.87 | 0.30 | 100.0 |
| 11 | 71.31 | 15.00 | 0.63 | 0.11 | 10.80 | 1.06 | 0.03 | 0.00 | 0.86 | 0.20 | 100.0 |
| 12 | 70.92 | 15.10 | 0.63 | 0.11 | 11.10 | 1.05 | 0.03 | 0.00 | 0.86 | 0.20 | 100.0 |
| 13 | 71.66 | 14.90 | 0.59 | 0.04 | 10.50 | 0.97 | 0.30 | 0.00 | 0.86 | 0.15 | 100.0 |
| 14 | 71.93 | 14.90 | 0.59 | 0.04 | 10.50 | 0.97 | 0.03 | 0.00 | 0.86 | 0.15 | 100.0 |
| 15 | 71.72 | 14.90 | 0.59 | 0.04 | 10.50 | 0.97 | 0.30 | 0.00 | 0.83 | 0.15 | 100.0 |
| 16 | 71.65 | 14.90 | 0.59 | 0.04 | 10.50 | 0.97 | 0.40 | 0.00 | 0.80 | 0.15 | 100.0 |
| 17 | 71.41 | 14.90 | 0.59 | 0.04 | 10.50 | 0.97 | 0.40 | 0.00 | 1.04 | 0.15 | 100.0 |
| 18 | 71.79 | 14.90 | 0.59 | 0.04 | 10.50 | 0.97 | 0.40 | 0.00 | 0.66 | 0.15 | 100.0 |
| 19 | 71.15 | 14.90 | 0.59 | 0.10 | 10.60 | 0.97 | 0.55 | 0.00 | 0.99 | 0.15 | 100.0 |
| 20 | 71.41 | 14.90 | 0.59 | 0.04 | 10.50 | 0.97 | 0.45 | 0.00 | 0.99 | 0.15 | 100.0 |
| 21 | 71.39 | 14.80 | 0.59 | 0.11 | 10.50 | 1.02 | 0.45 | 0.00 | 0.99 | 0.15 | 100.0 |
| 22 | 71.91 | 14.90 | 0.59 | 0.04 | 10.50 | 0.97 | 0.39 | 0.00 | 0.55 | 0.15 | 100.0 |
| 23 | 71.34 | 14.90 | 0.59 | 0.04 | 10.50 | 0.97 | 0.39 | 0.00 | 1.12 | 0.15 | 100.0 |
| 24 | 71.91 | 14.90 | 0.59 | 0.04 | 10.50 | 0.97 | 0.39 | 0.00 | 0.55 | 0.15 | 100.0 |
| 25 | 71.88 | 14.90 | 0.59 | 0.04 | 10.50 | 0.97 | 0.39 | 0.00 | 0.56 | 0.15 | 100.0 |
| 26 | 71.29 | 14.90 | 0.60 | 0.30 | 10.40 | 1.00 | 0.39 | 0.00 | 0.82 | 0.30 | 100.0 |
| 27 | 71.09 | 14.90 | 0.60 | 0.50 | 10.40 | 1.00 | 0.39 | 0.00 | 0.82 | 0.30 | 100.0 |
| 28 | 70.42 | 14.90 | 0.60 | 0.10 | 10.50 | 1.00 | 0.35 | 1.00 | 0.83 | 0.30 | 100.0 |

TABLE 2

| Glass No. | LT(ILLA) (%) | DSHT (%) | Performance (LT ILLA) - DSHT (%) | PM UV rect (%) | ILLC a* | ILLC b* | Thickness (mm) | Fe$^{2+}$ |
|---|---|---|---|---|---|---|---|---|
| 1 | 70.9 | 40.0 | 30.9 | 46.1 | −9.4 | −1.5 | 4.10 | 35 |
| 2 | 72.6 | 42.5 | 30.1 | 45.8 | −8.7 | −0.7 | 4.16 | 37 |
| 3 | 71.4 | 40.7 | 30.7 | 46.7 | −9.1 | −1.5 | 3.96 | 34 |
| 4 | 71.7 | 41.4 | 30.3 | 46.2 | −8.9 | −1.2 | 4.01 | 36 |
| 5 | 70.8 | 39.8 | 31.0 | 46.0 | −9.5 | −1.4 | 4.18 | 33 |
| 6 | 71.0 | 40.0 | 31.0 | 45.7 | −9.5 | −1.3 | 4.21 | 33 |
| 7 | 71.2 | 40.9 | 30.3 | 44.0 | −9.2 | −0.7 | 4.06 | 35 |
| 8 | 70.0 | 38.7 | 31.3 | 45.9 | −9.9 | −2.0 | 4.14 | 39 |
| 9 | 71.2 | 40.5 | 30.7 | 45.3 | −9.3 | −1.1 | 4.10 | 34 |
| 10 | 70.3 | 39.6 | 30.7 | 40.7 | −9.7 | 0.8 | 4.02 | 37 |
| 11 | 71.2 | 41.2 | 30.0 | 44.1 | −9.1 | −0.6 | 4.08 | 32 |
| 12 | 72.2 | 42.6 | 29.6 | 44.7 | −8.7 | −0.2 | 3.96 | 31 |
| 13 | 70.2 | 40.0 | 30.2 | 38.8 | −9.7 | 1.7 | 4.23 | 32 |
| 14 | 73.7 | 44.8 | 28.9 | 44.4 | −8.1 | 0.4 | 3.95 | 29 |
| 15 | 70.9 | 40.6 | 30.3 | 41.6 | −9.4 | 1.0 | 4.00 | 34 |
| 16 | 70.6 | 40.0 | 30.6 | 41.7 | −9.7 | 0.9 | 4.05 | 36 |
| 17 | 70.6 | 41.4 | 29.2 | 39.2 | −9.1 | 2.1 | 3.17 | 35 |
| 18 | 72.1 | 41.9 | 30.2 | 42.6 | −9.3 | 1.2 | 5.03 | 33 |
| 19 | 72.1 | 43.0 | 29.1 | 39.5 | −8.7 | 2.7 | 3.13 | 35 |
| 20 | 71.5 | 42.1 | 29.4 | 39.2 | −8.9 | 2.3 | 3.27 | 35 |
| 21 | 70.7 | 40.8 | 29.9 | 39.6 | −9.3 | 2.0 | 3.20 | 39 |
| 22 | 83.2 | 62.0 | 21.2 | 64.6 | −4.2 | −0.1 | 2.13 | 40 |
| 23 | 71.4 | 42.7 | 28.7 | 39.0 | −8.6 | 2.3 | 2.81 | 37 |
| 24 | 83.4 | 63.2 | 20.2 | 62.8 | −4.0 | 0.4 | 2.34 | 35 |
| 25 | 84.0 | 64.7 | 19.3 | 63.2 | −3.7 | 0.5 | 2.15 | 35 |
| 26 | 70.5 | 40.0 | 30.5 | 41.5 | −9.8 | 0.9 | 4.12 | 36 |
| 27 | 71.9 | 42.4 | 29.5 | 41.4 | −9.2 | 1.3 | 4.06 | 32 |
| 28 | 70.9 | 41.1 | 29.8 | 40.8 | −9.4 | 1.1 | 3.91 | 34 |

TABLE 3

| Glass No. | LT(ILLA) (%) | DSHT (%) | Performance (LT ILLA) - DSHT (%) | PM UV rect (%) | ILLC a* | ILLC b* | Converted Thickness (mm) | Fe$^{2+}$ |
|---|---|---|---|---|---|---|---|---|
| 22 | 76.4 | 47.5 | 28.9 | 52.9 | −7.5 | −0.2 | 4.00 | 40 |
| 23 | 70.2 | 41.0 | 29.2 | 37.4 | −9.1 | 2.5 | 3.00 | 37 |
| 24 | 75.0 | 45.6 | 29.4 | 47.8 | −8.1 | 0.7 | 5.00 | 35 |
| 25 | 75.0 | 45.4 | 29.6 | 46.4 | −8.3 | 1.0 | 5.00 | 35 |

The glasses of the present invention are primarily intended for automotive use. When used in laminated form, a film of suitable lamination material, such as polyvinyl butyral, may be sandwiched between a sheet of glass having a composition in accordance with the present invention and a second sheet of glass having appropriate properties. Preferably, however, the lamination film is sandwiched between two pieces of glass having a composition in accordance with the present invention. It will be readily appreciated that, to satisfy legal requirements in many countries, particularly in respect of lights located forward of the B-post, the laminated structure must have a light transmission of at least 70%. Clearly, it is desirable to select the glasses forming the outer layers of the laminate such that the laminated structure still has a performance not less than 28%.

It will be readily apparent to those skilled in the art that various minor changes may be made to the glass of the present invention without departing from the scope thereof. Thus, for example, the glass of the present invention could be used for architectural purposes.

What is claimed is:

1. A green glass composition which contains at least 14.5% by weight $Na_2O$, at least 10.5% by weight CaO and at least 0.5% by weight total iron (measured as $Fe_2O_3$), the glass being substantially magnesium-free, the glass thus produced having a ferrous value of at least 30% and a performance (light transmission minus direct solar heat transmission) of at least 28% at at least one thickness of from 2.8 mm to 5 mm.

2. A composition as claimed in claim 1 in which the amount of CaO is equal to or less than 12%.

3. A composition as claimed in claim 2 in which the amount of CaO is less than 11%.

4. A composition as claimed in claim 1 additionally containing $K_2O$ in a maximum amount of 1% by weight.

5. A composition as claimed in claim 1 additionally containing $TiO_2$ in a maximum amount of 1% by weight.

6. A composition as claimed in claim 5 wherein the $TiO_2$ is present in an amount of 0.20% to 0.60% by weight.

7. A composition as claimed in claim 6 wherein the source of the $TiO_2$ is ilmenite.

8. A composition as claimed in claim 1 additionally containing $Al_2O_3$ in a maximum amount of 1.6% by weight.

9. A composition as claimed in claim 1 additionally containing $ZrO_2$ in a maximum amount of 1% by weight.

10. A composition as claimed in claim 1 additionally containing at least one of $CeO_2$ and $V_2O_5$.

11. A glass sheet having a composition as claimed in claim 1 having a performance of at least 28% at a thickness of 2.8 mm.

12. A glass sheet having a composition as claimed in claim 1 having a performance of at least 28% at a thickness of 5 mm.

13. A glass sheet having a composition as claimed in claim 1 having a light transmission of at least 70%.

14. A glass sheet formed from a composition as claimed in claim 1 comprising 70% to 75% (by weight) $SiO_2$, 0.25% to 0.55% $TiO_2$ and 0.75% to 0.95% $Fe_2O_3$, the glass having a ferrous value of 33% to 37% and a light transmission of at least 70% at a nominal thickness of 4 mm.

15. A glass sheet formed from a composition as claimed in claim 1 comprising 70% to 75% (by weight) $SiO_2$, 0.25% to 0.45% $TiO_2$ and 0.95% to 1.05% $Fe_2O_3$, the glass having a ferrous value of 33% to 37% and a light transmission of at least 70% at a nominal thickness of 3.15 mm.

16. A glass sheet formed from a composition as claimed in claim 1 comprising 70% to 75% (by weight) $SiO_2$, 0.50% to 0.65% $Fe_2O_3$ and 0.25% to 0.55% $TiO_2$ and a ferrous value of between 33% and 37%, the glass having a light transmission of at least 70% at a nominal thickness of 4.6 mm.

17. A glass formed from a composition as claimed in claim 1 in monolithic form.

18. A laminate comprising two sheets of glass separated by an interlayer, wherein at least one of the sheets of glass is formed from a composition as claimed in claim 1.

19. A laminate comprising two sheets of glass separated by an interlayer, wherein both sheets of glass are formed from a composition as claimed in claim 1.

20. A laminate as claimed in claim 18 in which the interlayer is polyvinyl butyral.

21. A laminate comprising two sheets of glass formed from a composition as claimed in claim 15, each sheet having a thickness of 2.3 mm and a polyvinyl butyral interlayer, the laminate having a light transmission of at least 70%.

* * * * *